United States Patent [19]
Derderian et al.

[11] Patent Number: 5,798,818
[45] Date of Patent: Aug. 25, 1998

[54] CONFIGURABLE CINEMA SOUND SYSTEM

[75] Inventors: Ara J. Derderian, Alta Loma; Daniel J. Minear, Westminster; Paul M. Embree, Irvine; James S. Mercs, Huntington Beach, all of Calif.

[73] Assignees: Sony Corporation, Tokyo, Japan; Sony Pictures Entertainment, Culver City, Calif.

[21] Appl. No.: 940,747

[22] Filed: Sep. 30, 1997

Related U.S. Application Data

[63] Continuation of Ser. No. 544,353, Oct. 17, 1995, abandoned.
[51] Int. Cl.[6] ............................................. G03B 31/04
[52] U.S. Cl. ........................................ 352/31; 352/11
[58] Field of Search ................................. 352/5, 11, 31

[56] References Cited

U.S. PATENT DOCUMENTS

| | | | |
|---|---|---|---|
| 3,973,839 | 8/1976 | Stumpf et al. | 352/5 |
| 4,256,389 | 3/1981 | Engebretson | 352/11 |
| 4,385,814 | 5/1983 | Elliot | 352/92 |
| 5,155,510 | 10/1992 | Beard | 352/27 |
| 5,280,314 | 1/1994 | Hymes | 352/129 |
| 5,386,255 | 1/1995 | Beard et al. | 352/5 |
| 5,386,256 | 1/1995 | Taylor et al. | 352/27 |
| 5,450,146 | 9/1995 | Chedeville et al. | 352/31 |
| 5,550,603 | 8/1996 | Yoshimura et al. | 352/27 |
| 5,617,158 | 4/1997 | Miyamori et al. | 352/37 |

*Primary Examiner*—Safet Metjahic
*Assistant Examiner*—John Chizmar
*Attorney, Agent, or Firm*—Jerry A. Miller

[57] ABSTRACT

A theater sound processing system that provides preset configurations including parameters that can be modified by a user. Other setup parameters are modifiable by the manufacturer or a third party such as a sound technician who provides such parameters at installation time. The parameters allow control of equalization settings, gain, noise reduction processing, surround sound processing, and other audio characteristics. The designation of user modifiable parameters and non-user modifiable parameters insures that the user is given safe control over necessary parts of the system. User-modifiable parameters are changed via a user interface. Other parameters can be transferred to the sound processing system via a portable computer or by communications link. In a digital sound processing embodiment of the invention the entire sound processing ability of the system can be updated by downloading new signal processing software.

26 Claims, 10 Drawing Sheets

CONFIGURABLE CINEMA SOUND SYSTEM

This is a continuation of application Ser. No. 08/544,353 filed on Oct. 17, 1995 now abandoned which is hereby incorporated by reference.

SOURCE CODE APPENDIX

A microfiche appendix of computer language source code for a preferred embodiment (© 1995 Sony Corporation) is filed herewith. A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

This invention relates generally to sound processing systems and specifically to a configurable cinema sound processing system for use in theaters.

BACKGROUND OF THE INVENTION

The cinema sound systems found in today's theaters have evolved to include several sound formats and playback modes. The sound formats are defined by the manner in which the sound signals are recorded on the playback medium. Typically the playback medium is an optical or magnetic track on the film itself. However, the sound signals may come from a source other than the film as where a compact disk ("CD") or magnetic tape is synchronized to the film. The sound signal is traditionally passed through a cinema sound circuit to derive signals for one or more channels. Each channel signal is unique and is used to drive one or more speakers. The characteristics of the channels, such as the number of channels and relationship of one channel to another, determines the "mode" of sound playback of the cinema sound system.

Older films used a simple monaural ("mono") sound playback mode where all of the sound is present on a single electrical channel for playback over one or more speakers. In mono sound even if more than one speaker is used each of the speakers plays the same sound signal. Stereo mode allows left and right channels to have different signals, thus providing more realistic "separation" of sound resulting in simulated spatial placement of sound sources during playback. While stereo playback modes allow two channels, other multi-channel modes allow even more channels.

A popular multi-channel mode is known as "surround sound." Surround sound uses up to eight channels whose signals are derived from a pair of signals on the film or other medium. Typically, a theater equipped with a surround sound system uses left, right, center, left-center, right-center, surround-left, surround-right and sub-woofer channels. The left, right and center speakers are positioned toward the front of the theater, the left-center and right-center speakers are between the left/center and right/center speaker pairs, respectively. The surround left and surround right speakers are positioned at the left and right sides of the theater, respectively. The sub-woofer channel may be powered by several large low frequency speakers located around the theater, especially towards the back of the theater.

In addition to the sound modes, cinema sound systems include noise reduction ability which is used to improve the sound quality in any of the modes. Popular noise reduction standards are Dolby Type A and Dolby Spectral Recording ("SR"). Systems that implement these noise reduction standards modify the sound before it is recorded ("compression") and reverse modify the sound before it is played through the speakers so that only the original sounds are heard ("decompression").

A problem faced by theater sound system operators is that sound playback modes often differ from movie to movie. For example, one movie may be in stereo while another is in a surround sound playback mode. Further, the playback mode may be coupled with a noise reduction standard so that the appropriate sound decompression circuitry must be selected for proper sound reproduction. Another important aspect in a listener's perception of the quality of the soundtrack is the specific theater's acoustics and placement of speakers. That is, the distance of stereo separation, the degree of implementation of the surround sound speaker array, balance and equalization within the theater, etc., may differ from theater to theater. Since an operator may have to deal with showing several different movies on any given day the number of permutations of sound modes, noise reduction standards and theater acoustics can be daunting. The operator's task is further complicated when multiple projectors, providing multiple signal sources, are used to show a single movie.

Thus, it is desirable to provide a cinema sound system that is easily configurable and provides a degree of automation in matching the proper audio system characteristics with a particular movie sound track.

SUMMARY OF THE INVENTION

The present invention provides a cinema sound system that allows a theater sound operator, special technician, manufacturer, or other source to program configurations of sound modes, noise reduction formats and other parameters and store the configurations in the form of presets. The system uses a single device to digitally process and implement the various sound modes, noise reduction formats and other audio processing required in a cinema sound system. The system allows multiple signal sources to be selected and calibrated and to be incorporated into the presets.

In a preferred embodiment a method for reproducing sound from an audiovisual production is disclosed. The audiovisual production is played back using a playback device located in a theatre. The method utilizes a digital cinema sound system including a digital processor coupled to a memory, the playback device and at least one speaker. The method further utilizes a digital transfer system for transferring data and comprises the following steps: creating a program definition including at least one parameter specifying the playback of the sound portion of the audiovisual production; storing the program definition in the memory of the digital cinema sound system; and using the processor to play back the sound portion of the audiovisual production according to the at least one parameter of the program definition so that the signals generated by the playback device are used to drive the speaker to create audible sound.

DETAILED DESCRIPTION OF A PREFERRED EMBODIMENT

Figure 1:
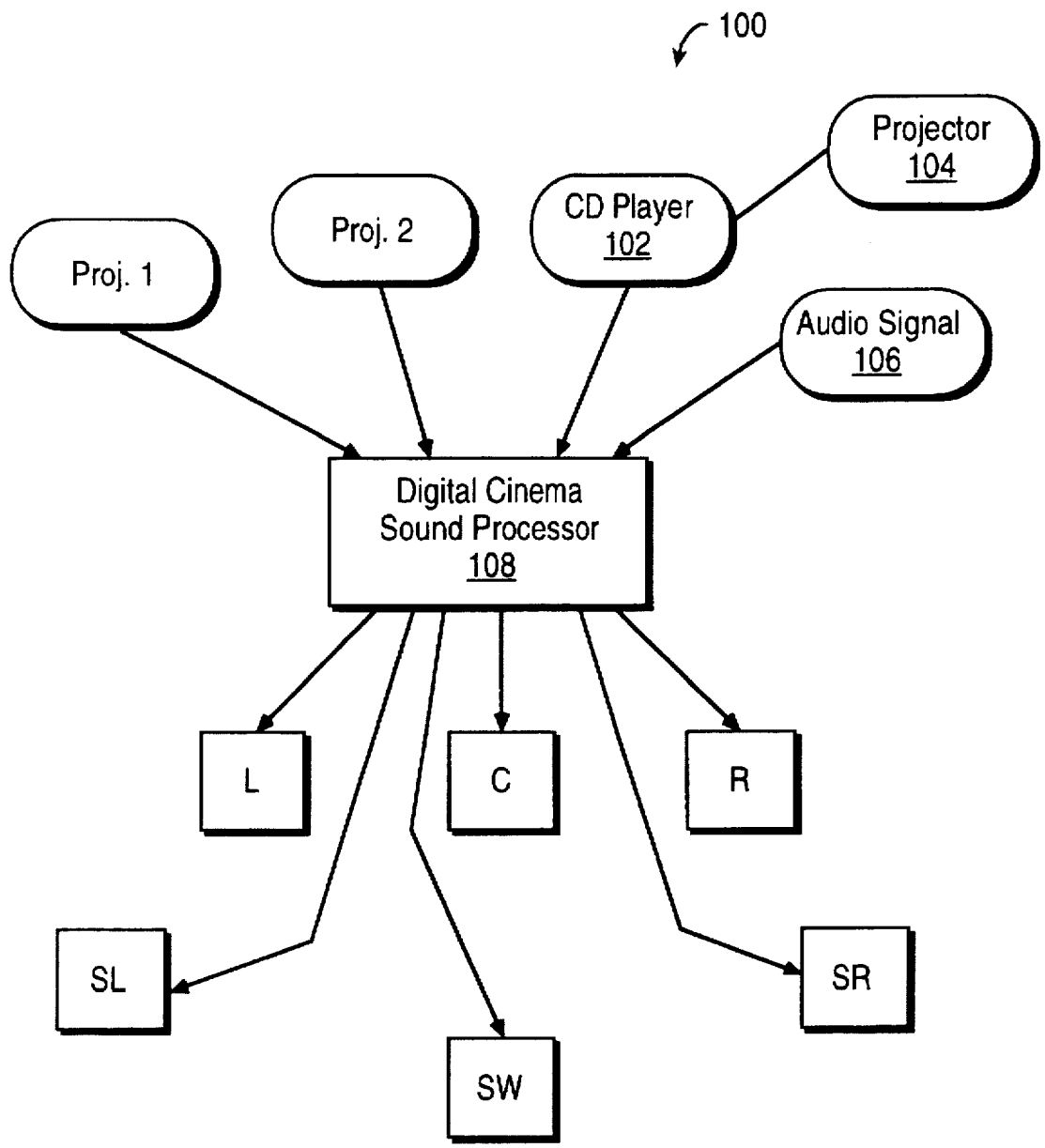
FIG. 1 is a diagram illustrating the inputs and outputs of the digital cinema sound processing system of the present invention.

FIG. 1 is a diagram illustrating the inputs and outputs of the digital cinema sound processing system of the present invention. In FIG. 1, system 100 is shown having digital cinema processor ("DCP") 108 with inputs from Projector 1, Projector 2, compact disc ("CD") player 102, projector 104 and audio signal source 106. A preferred embodiment of the present invention uses a digital cinema processor known as the DCP-1000 developed by Sony Corporation.

DCP 108 accepts inputs from photoelectric cells commonly used as transducers in movie projectors such as Projector 1, Projector 2 and Projector 104. Photoelectric cells in the projectors are used to convert an optical track on the film into electrical analog sound signals. The DCP then converts the analog sound signals to digital signals and performs digital signal processing to implement various sound modes and noise reduction formats along with performing other audio processing as discussed below. Although the DCP-1000 uses digital technology to accomplish the sound processing functions, other, traditional forms of signal processing, such as analog circuitry, may be used with the present invention to perform the signal processing. In order for the system to be configurable according to the present invention certain of the components controlling key parameters, as discussed below, must be under electrical, as opposed to manual, control so that the parameters may be set automatically and the parameter values saved. In general, this application deals with the configurability of the cinema processing system and does not concern the actual signal processing aspects of the cinema sound processor, which may be implemented by any suitable means known in the art.

DCP 108 can be adapted to handle up to eight inputs from eight different sources. DCP 108 uses input cards, known as photoelectric cell ("PEC") cards in the preferred embodiment, that allow input signals from projectors or other sources to be applied to the DCP. Each PEC card allows one input that can be of two possible types. The input may be via a standard 4 conductor input compatible with a projector's photoelectric output signals, or the input may be a common non-synchronized signal input through a standard Radio Corporation of America ("RCA") plug. Thus, the DCP allows inputs from various devices such as CD player 102 or general audio signal source 106. This is useful in cases where alternative sound signal sources are used as, for example, where a CD player is synchronized to an external projector. Also, this allows the theater sound operator to play audio not intended to be synchronized with a film, such as music played before the film begins.

The outputs of DCP 108 are provided to speakers such as speakers 110–120 shown in FIG. 1. FIG. 1 shows a six speaker arrangement that is common to theaters having surround sound capability. In the surround sound arrangement, speaker 110 is the left speaker, speaker 112 is the center speaker, speaker 114 is the right speaker, speaker 116 is the left surround speaker, speaker 118 is the right surround speaker and speaker 120 is the sub-woofer. The speaker arrangement, and the number of speakers, may vary widely from that shown in FIG. 1. Also, various additional equipment may be used with the arrangement shown in FIG. 1. For example, external amplifiers and sound processing equipment may be placed between the outputs of the DCP and the speakers.

Figure 2:
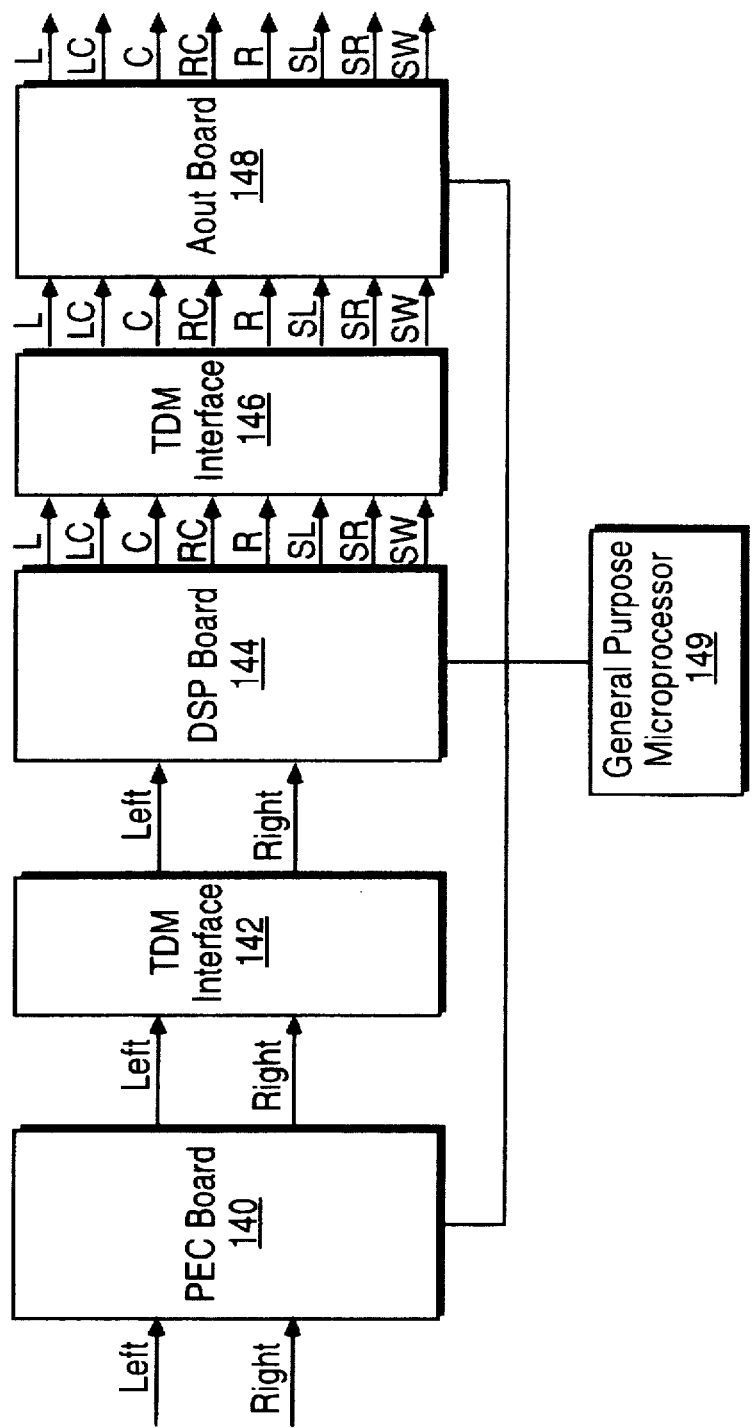
FIG. 2 shows the general path of signals through the digital cinema sound processing system.

FIG. 2 shows the general path of signals through the DCP. Signals enter the DCP from an external source such as a projector (not shown) through the PEC board 140. Typically there will be dual left/right signals from the signal source. PEC board 140 includes analog to digital ("A/D") converters to convert the left/right inputs to PEC board 140 to digital data. In the preferred embodiment the signals are assumed to be analog signals but provision can also be made for direct "digital in" signals in which case the A/D conversion may be skipped. Time division multiplex ("TDM") interface 142 is a serial data bus interface including associated controller and arbitration circuitry that accepts the digital data and distributes it to processors in digital signal processor ("DSP") board 144.

DSP board 144 performs the digital signal processing necessary to implement the sound modes, noise reduction and other signal processing to achieve the desired cinema sound. The outputs of DSP board 144 are shown as digital surround sound signals L, LC, C, RC, R, SL, SR and SW corresponding to left, left center, center, right center, right, surround left, surround right and sub-woofer speaker signals. In the surround sound environment additional signals are derived from the left/right signals by adding and subtracting the phase of the left/right signals. Note that not all of these signals need be output. For example, if the sound mode is simply stereo then only L and R signals need to be output with a sub-woofer signal, if desired. Any combination of signals may be automatically selected and preconfigured since the routing and selection of L, LC, C, RC, R, SL, SR and SW signals is under software control, as discussed below.

The outputs of DSP board 144 are output to a TDM data bus for input to analog output ("Aout") board 148. Aout board 148 includes digital to analog converters to convert the digital data output from the DSP into corresponding analog signals for the speakers. Naturally, where analog circuitry, rather than digital processing, is used to perform the signal processing functions, circuitry associated with digital processing, such as the A/D converters and data buses of the TDMs, can be omitted from the design.

General Purpose Microcomputer 149 communicates with PEC Board 140, DSP Board 144 and Aout Board 148. Microcomputer 149 may be any suitable microprocessor system including memory, I/O, etc. In the preferred embodiment, microcomputer 149 is an 80286 based computer which performs rudimentary control and configuration operations and executes the user interface of the present invention along with processing performed by DSP board 144. The distribution of tasks, such as the user interface, among the processors in the system is not critical so long as the digital signal processing is not unduly hampered. As mentioned, many other processor architectures are possible such as a single general purpose computer controlling traditional analog, or a mix of analog and digital, sound processing circuitry.

Figure 3:
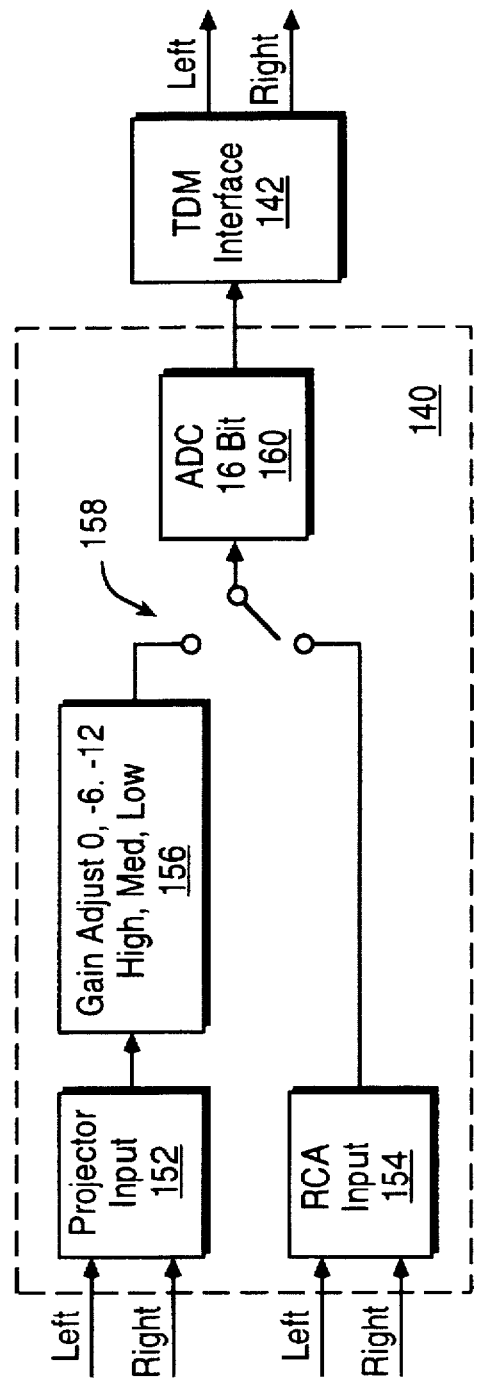
FIG. 3 shows details of a photoelectric cell input board.

FIG. 3 shows more details of PEC board 140 of FIG. 2. In general, where the same reference number is used in two different Figures it designates the same item.

In FIG. 3, PEC board 140 is shown with two input blocks 152 and 154 corresponding to a projector input or RCA input. Only one of the inputs at a time is selectable according to software controlled switch 158. The projector input signal passes through gain adjust block 156 which allows the configuration software in the DCP to set the gain at 0, –6 or –12 decibels ("dB"), as desired. Analog to digital converter ("ADC") 160 performs a 16-bit A/D conversion on whichever of the Projector or RCA input signals is selected by switch 158. The converted signal is passed to TDM interface 142.

Figure 4:
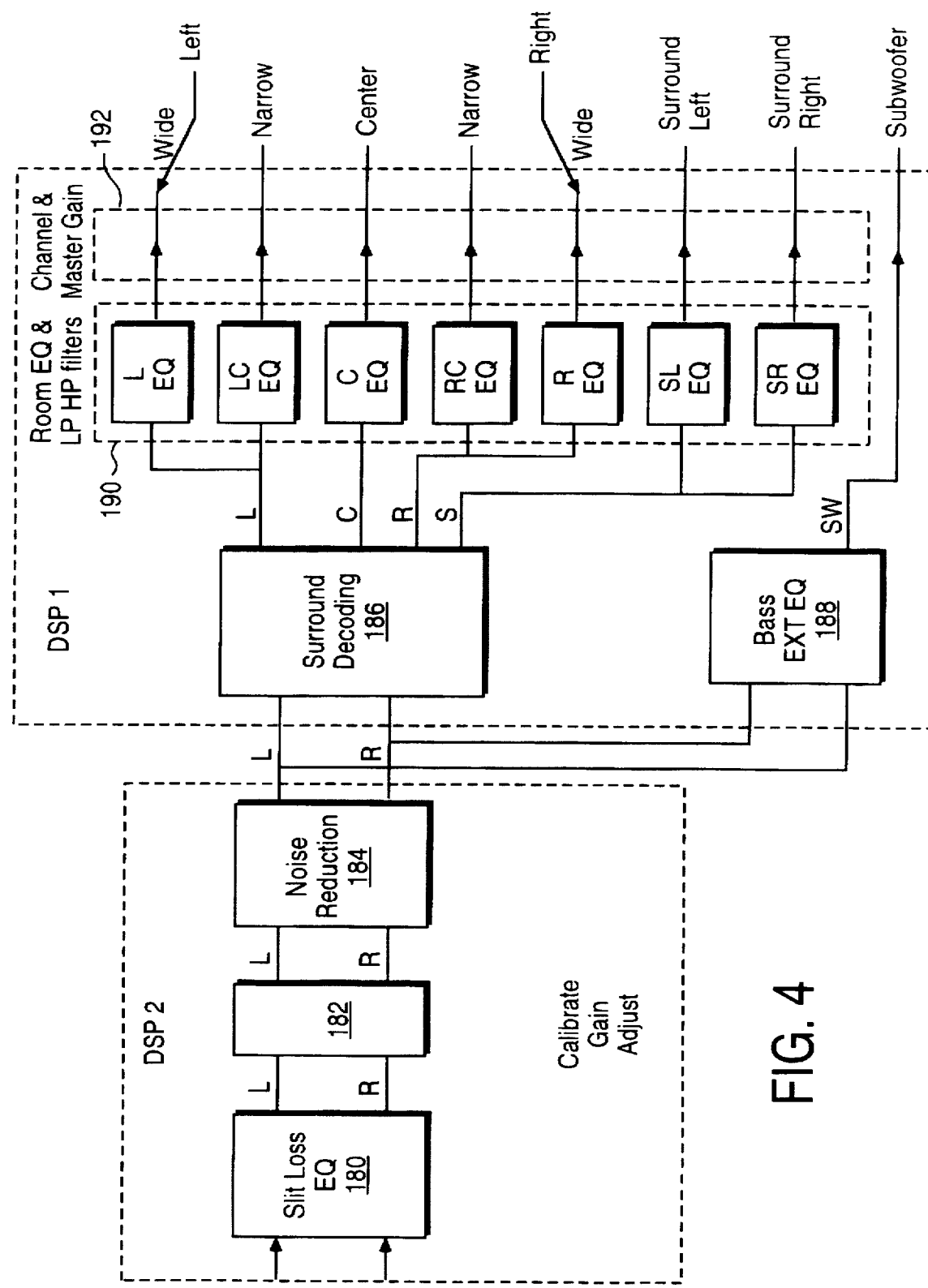
FIG. 4 shows details of the digital signal processor signal path.

FIG. 4 shows details of the DSP signal path. In FIG. 4, functions performed by the digital signal processing of the DSP are shown as blocks. The processing is further shown as consisting of two major functional blocks labeled DSP 1 and DSP 2. In actuality, the processing is performed in the digital domain among four processors as discussed below. Because the processing is performed digitally, there is no specific circuitry associated with any of the functional blocks shown in FIG. 4 and there is no corresponding "signal flow." Rather, the operations performed by the DSP are shown in terms of signal flow and functional blocks only for purposes of illustration and ease of discussion. However, an analog implementation of the sound signal processing would use the general signal flow and functional arrangement shown in FIG. 4.

In FIG. 4, DSP 2 processing includes Slit Loss Equalization ("EQ") processing 180, Calibrate Gain Adjust processing 182 and Noise Reduction processing 184. Slit Loss EQ processing 180 attenuates and amplifies predetermined frequencies in the input signal to compensate for signal degradation due to photoelectric transduction (assuming the signal source is from a projector) and other imperfections in the signal source and associated electronics. Calibrate Gain Adjust processing 182 adjusts the signal strength according to parameters set by the theater sound operator. Optionally, default parameters can be used for Calibrate Gain Adjust processing 182.

In the preferred embodiment, EQ and gain adjust functions are performed digitally by software so that parameterization and configuration of these functions is easily achieved. The software to accomplish the EQ and gain adjust functions is discussed in detail below. However, these functions can also be performed with more traditional analog circuitry, or alternative digital circuitry. For example, analog filters in series with electrically controlled attenuators can be used to achieve a configurable EQ with the parameters being the value of each attenuator setting for each filter frequency. Also, commercially available controllable filters, both digital and analog, may be employed. For a general discussion of engineering techniques to achieve signal processing functions used in the present invention a reference manual such as "Audio Engineering Handbook," 1988, Blair, Benson; published by McGraw Hill, may be consulted. Also, commercially available products can be used to perform the noise reduction and surround decoding of processes 184 and 186, respectively. For example, a product called "Pro-Logic" from Dolby Laboratories can be used to perform surround decoding while Dolby's Model 365 noise reduction system is available in SR and Type A modes.

Note that a feature of the present invention is that all of the processing functions are capable of automatic configuration and presetting. Thus, for example, the gain of L and R signals in Calibrate Gain Adjust processing 182 are stored parameters, as are parameters for frequency strength adjustments for Slit Loss EQ processing 180. The entire array of parameters, or a subset of the parameters, for all of the processing functions discussed herein is capable of being set and stored by a user of the digital cinema processing system, the manufacturer of the DCP or another party.

Some parameters are "global" parameters that are set by the manufacturer. The user is able to modify "local" parameters to adapt the system to a particular theater environment. For example, some parameters that are complex to determine, such as theater room EQ, can be set by the manufacturer of the DCP system or by a technician that comes to the specific theater with test equipment to determine the parameters by experimentation. Other parameters, such as for Slit Loss EQ are known depending upon the characteristics of known signal sources and can be accurately set by the manufacturer. The global parameters set by the manufacturer or third party are referred to as part of the "setup" of the DCP. The local parameters that may be set by a sound system operator at the theater are referred to as "preset" parameters. This approach provides flexibility without putting an undue burden on the theater sound system operator. Further, the operator is protected from making wrong inputs to sensitive parameters from which recovery may be difficult.

In the preferred embodiment, Slit Loss EQ parameters are part of the setup parameters determined by the manufacturer while the Calibrate Gain Adjust parameters are user-definable presets, as discussed below. Other embodiments may regard setup parameters described here as presets and vice versa. It should be apparent that additional parameters can be employed depending on the circuitry used and that some parameters used in the preferred embodiment need not be used in all embodiments.

Noise Reduction processing 184 is performed after the signals have been subjected to Slit Loss EQ processing and Calibrate Gain Adjust processing. In the preferred embodiment, Noise Reduction processing 184 includes processing compatible with Dolby Type A noise reduction and Dolby Spectral Recording noise reduction standards promulgated by Dolby Laboratories. These standards are described, for example, in papers by Ray M. Dolby published in the Journal of Audio Engineering Society as "An Audio Noise Reduction System," vol 15, pp. 383–88, October, 1967 and "The Spectral Recording Process," vol 35, no. 3, March 1987; for the Type A and SR standards, respectively. However, any type of noise reduction may be implemented in the present invention. The noise reduction parameters are determined by the manufacturer and are not user adjustable.

After noise reduction processing the signals are processed according to Surround Decoding 186 and Bass EXT EQ processing 188. Surround Decoding 186 splits the L and R signals into up to 8 surround signals. The surround decoding also complies with specifications determined by Dolby Laboratories. For a discussion of the surround decoding standard see, e.g., "Sound Recording," Ch. 4, by John Eargle, published by Van Nostrand Rheinhold Co.

Bass EXT EQ processing deals with sub-woofer equalization and level and are presets that are adjustable by the technician who installs the digital cinema processing system.

Outputs of Surround Decoding processing are surround sound signals L, C, R, SL and SR.

These signals are sent to separate EQ functions. Note that signals L and R are split into Wide Left/Narrow Left and Wide Right/Narrow Right signals, respectively. This is a provision for theaters that have more or less stereo separation corresponding to wide or narrow left and right channels. Again, since all of the processing is performed in hardware, the application of output signals to the channels designated as Wide Left, Narrow Left, Center, Narrow Right, Wide Right, Surround Left, Surround Right and SubWoofer are highly configurable. That is, some or all of the signals can be muted as might be desired where a theater does not have all of the surround sound channels. The signals can be re-assigned to provide for other sound formats such as the Sony Dynamic Digital Sound ("SDDS") format standard which uses eight channels that are different from the surround sound channels. Another example is where the sound mode is simple stereo.

Depending on whether the theater left and right speakers are close together or farther apart, wide or narrow stereo modes can be selected as part of the preset configuration by the user.

In the preferred embodiment, the room EQ parameters of Room EQ & LP HP filter processing ("EQ and Filter processing") 190 are set by a technician who uses special equipment to determine the optimum EQ settings for a particular theater. The technician downloads the parameters into the DCP unit via a device such as a portable computer. Manufacturer setup parameters may also be loaded in this manner. Other ways to load the DCP unit with parameters can be via telecommunication links such as telephone wire, radio, infrared, laser/fiber optic, etc. Networks such as the Internet can be used to provide automatic updating of parameters, both global and local, and of processing software. Because the system performs all of the significant audio signal processing in software, the system has the ability to implement entirely new sound standards without any change of hardware.

EQ and Filter processing 190 includes low pass ("LP") and high pass ("HP") filters that are selectable by the user as presets. Channel and Master Gain processing is settable by the user to control the gain of each channel individually, and to provide a master volume control for all channels collectively.

Figure 5:
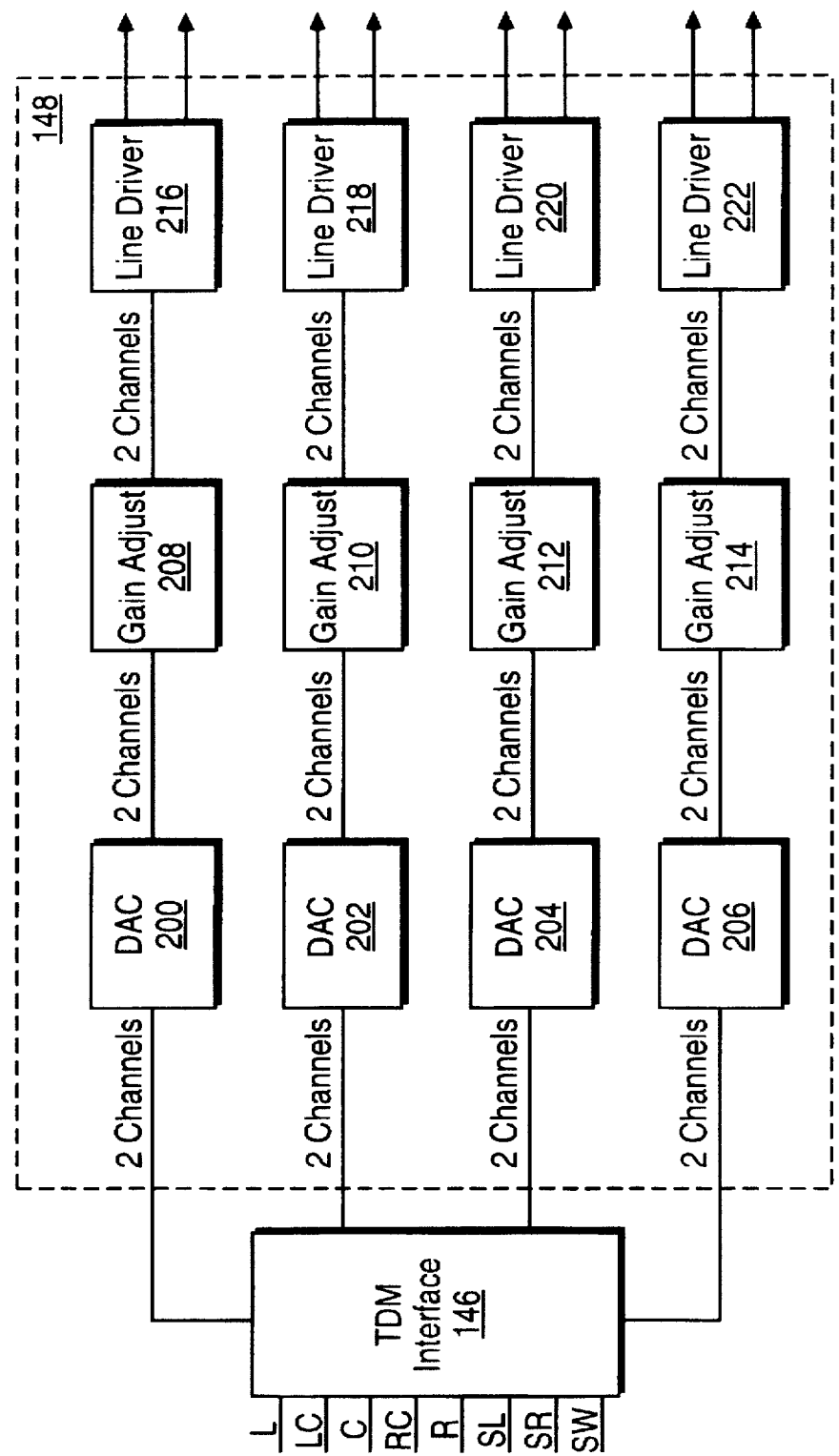
FIG. 5 shows details of an analog output board.

FIG. 5 shows details of the Aout board 148 and TDM data bus 146 of FIG. 2. In FIG. 5, signals that are output from DSP 144 are input to TDM data bus 146. The data is distributed among DACs 200, 202, 204, and 206. For ease of illustration each L/R pair of signals is shown as a single line. DACs 200, 202, 204 and 206 convert the signals to analog signals and send the analog signals to gain adjusters 208, 210, 212 and 214. These gain adjusters are analog circuits which are not under software control but which may be set manually. Line drivers 216, 218, 220 and 222 are used to convert the L/R signals to balanced signals for transmission to speaker amplifiers.

Appendix A includes source code in the "C" computer language as defined by manuals published by Analog Devices, including the "Programmer's Reference Manual" for the ADSP-2106x based systems manufactured by Analog Devices. This language uses the standard "C" syntax and constructs as described, for example, in "Programming in C," by Kernighan, Ritchie, but provides for parallel processing in a multiprocessor environment.

The source code module "I1EQSET1.ASM" is the code that performs EQ processing and high and low pass filtering. This module executes on one of the two signal processors in the system of the present invention. Include files such as "def21060.h," and "asm_sprt.h" are provided as part of the applications library and are defined in the references. Functions such as "dm" and "_cascaded_biquad" are provided in the applications library to perform functions such as, respectively, accessing data memory and performing a second order filter calculation. These functions are explained in detail in the references.

Referring to Appendix A, inputs from surround decoding processing (block 186 of FIG. 4) are obtained at lines 502. At lines 504, these values are subjected to equalization and high/low pass filtering to implement the processing of block 190. The coefficients used by the _cascaded_biquad routine are prestored as dictated by the _cascaded_biquad calling parameters specified in the references.

Other processing performed by the source code of Appendix A includes left and right channel signal scaling prior to sending the inputs to noise reduction processing. That is, the processing of block 182 is performed at lines 506 and 508 where parameters defined by the user (see discussion below in connection with FIG. 10) are used to adjust the signal strength by multiplying the signal values by a predetermined gain factor.

Figure 6:
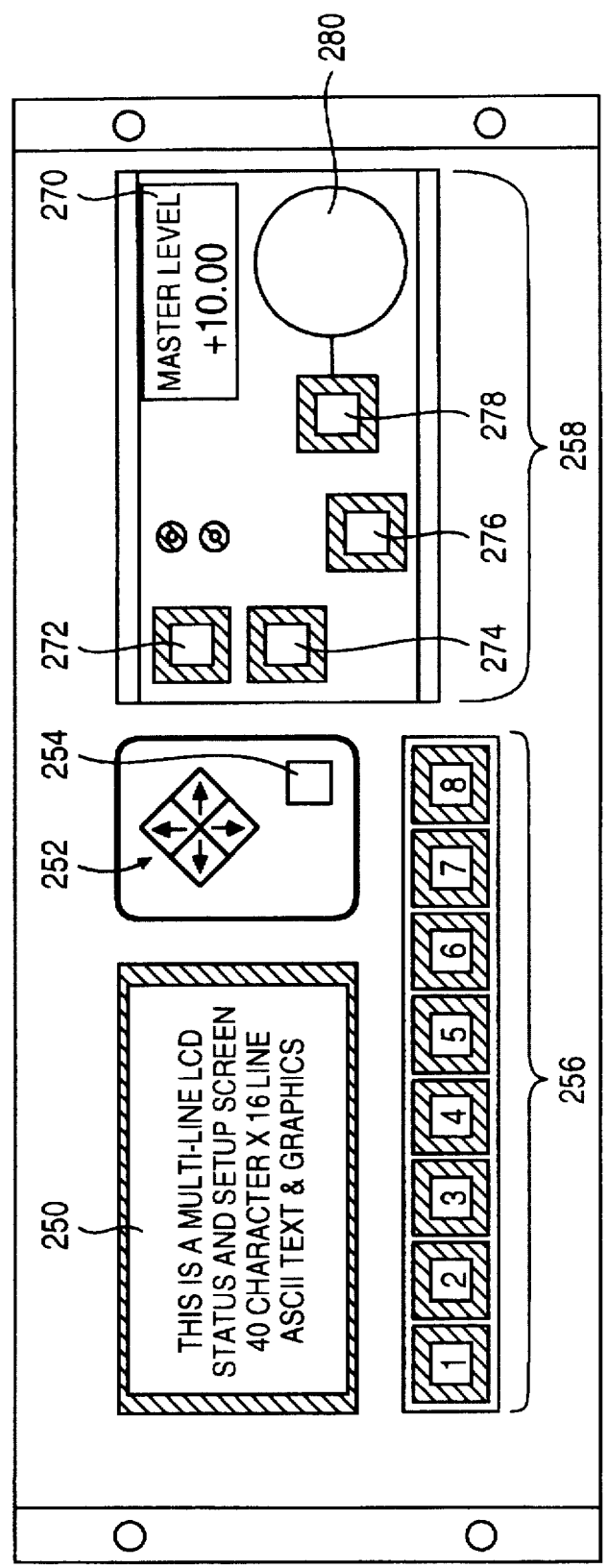
FIG. 6 shows the front panel of the digital cinema processor.

FIG. 6 shows the front panel of the DCP-1000 digital cinema processor. The front panel includes display 250 and several groups of controls such as cursor buttons at 252, select button 254, preset recall buttons 256 and additional controls at 258 including Input A select button 272, Input B select button 274 (for selecting the input assigned as either Input A or Input B), remote enable button 276 to allow the unit to be operated from an external, remote controller; mute button 278 to mute the entire output of the DCP and dial 280 for setting numeric values as displayed in meter display 270. While the DCP-1000 provides the user with many basic control functions, the discussion below focuses on the ability of the DCP-1000 to be configured by the user for different sound modes, noise reduction formats and other sound playback characteristics.

Figure 7:
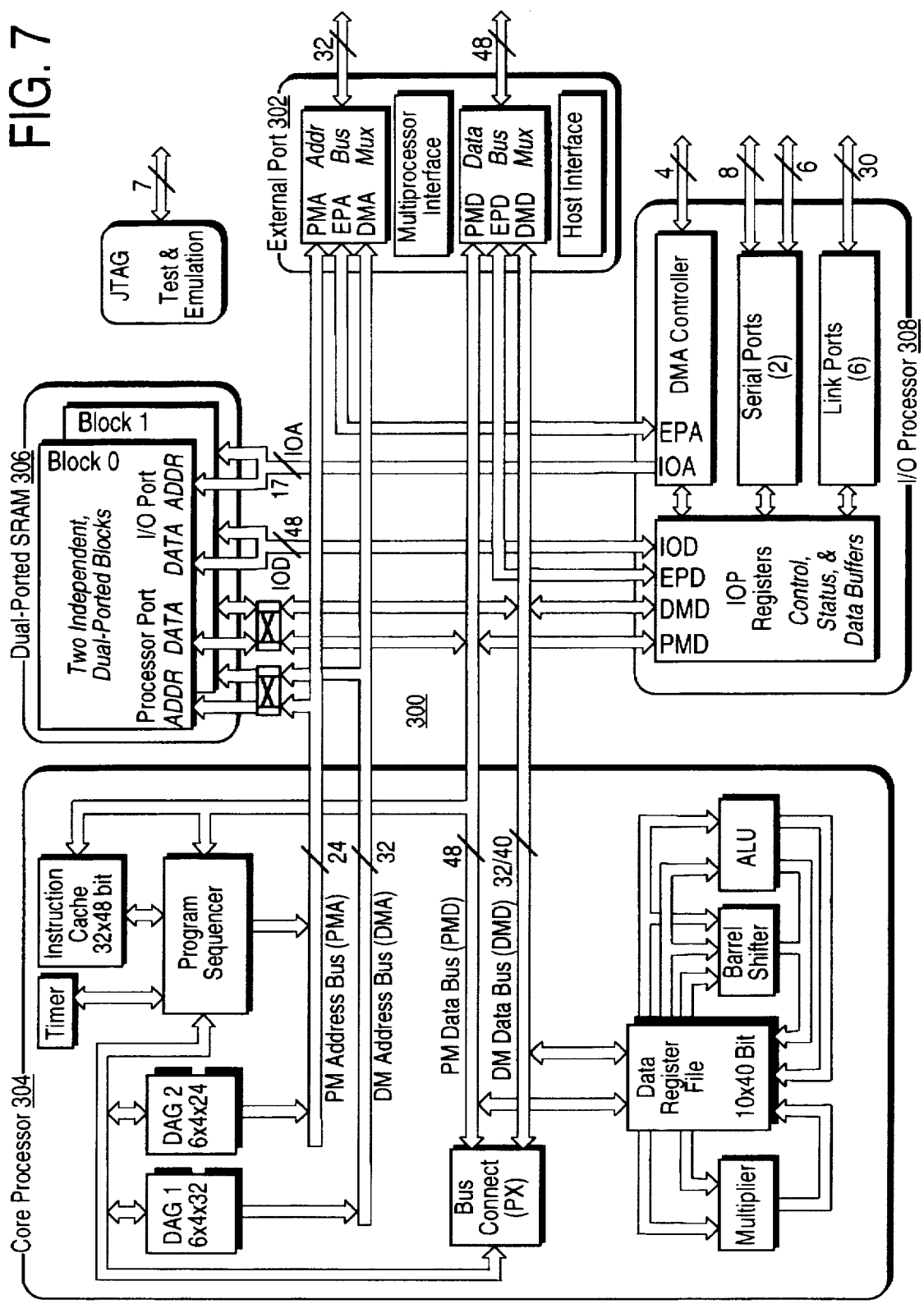
FIG. 7 is a diagram of a processor in the digital cinema processor.

FIG. 7 is a diagram of processor 300 in the DCP. In the preferred embodiment, the DCP uses two processors such as the one shown in FIG. 7 manufactured by Analog Devices, Inc., of Norwood Mass. The processors are part number ADSP-2106. For more information on this processor refer to the ADSP-2106x user's manual and ADSP-21060/62 Data Sheet for timing, electrical and package specifications. The two processors in the DCP communicate via the multiprocessor interface 302 so that a multiprocessor system is achieved. This allows some operations to be performed concurrently as discussed above in connection with the source code Appendix A.

Logic and arithmetic functions of each processor are performed by Core Processor 304 in each of the processors. Dual-Ported static random access memory ("SRAM") 306 stores program code that directs the core processor to perform the digital sound processing functions of the DCP. Also, the user interface and other functions of the DCP are performed by appropriate software executed from the SRAM. Data used by the core processor, and generated by the core processor, is also stored in the SRAM. Input/Output ("I/O") functions are achieved by I/O processor 308. The architecture of processor 300 is described in detail in the references. Other processor architectures are possible. For example, while the multiprocessor architecture discussed in connection with FIG. 7 is especially well-suited for digital signal processing, any general purpose central processing unit ("CPU") such as the 80×86 line of CPUs is capable of executing the user interface functions of the present invention. In the preferred embodiment, execution of program instructions to implement the user interface and configuration of the DCP is handled by both the signal processing core processors and by an 80286 CPU and associated hardware (such as memory, I/O, etc.).

The ADSP chip of FIG. 7 receives user input signals from the control panel of FIG. 6 via I/O processor 308. The ADSP chip also sends signals to display 250 of FIG. 6 through I/O processor 308. The I/O of the present invention, with respect to the user interface, can be accomplished by means well-known in the art.

Figure 8:
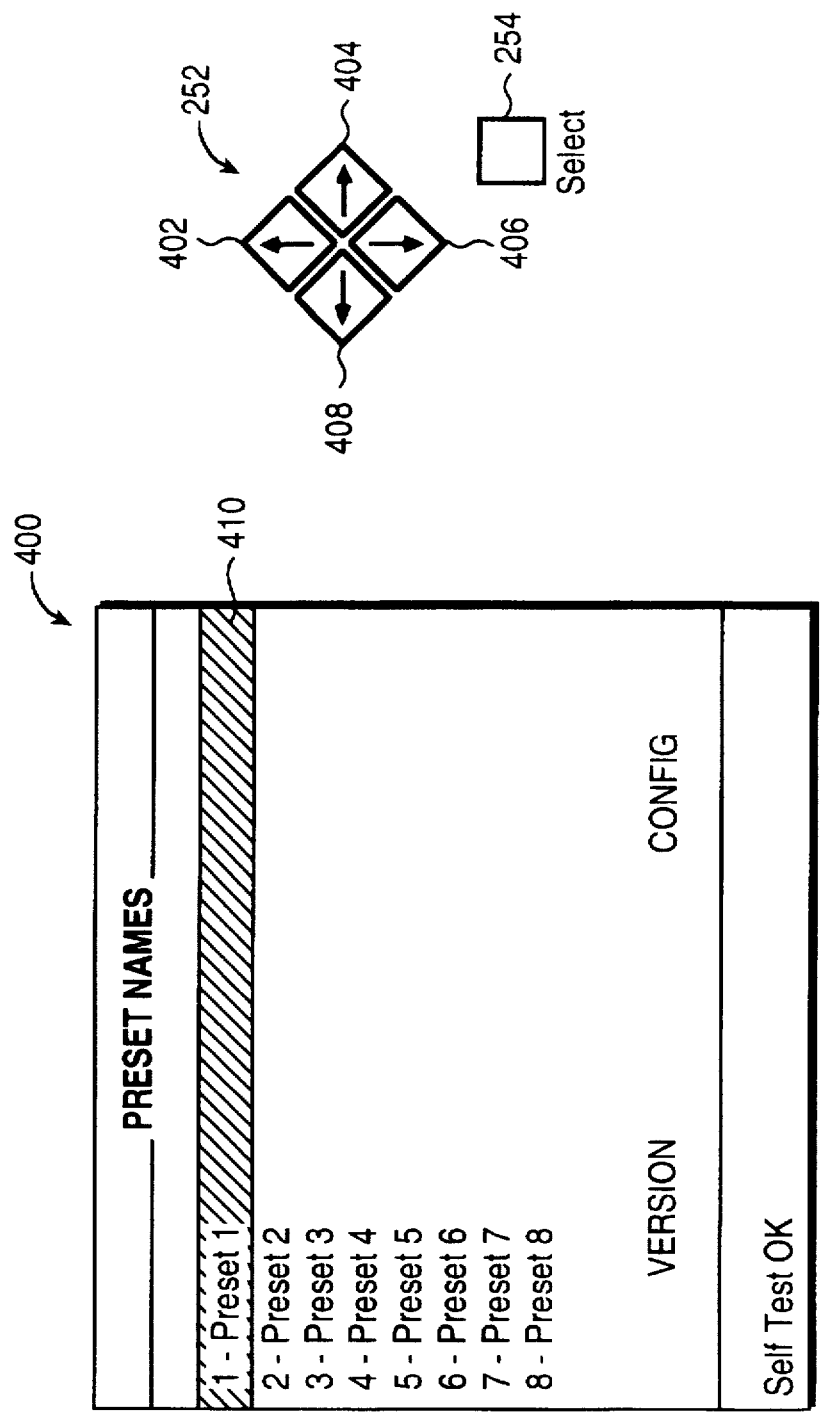
FIG. 8 shows a first screen display along with cursor buttons and a select button.

FIG. 8 shows a first screen display 400 along with cursor buttons 252 and select button 254. Screen display 400 includes a list of preset names with default names of "Preset 1" through "Preset 8". A user is able to select a preset by using up and down arrow buttons 402 and 406, respectively, to move highlight bar 410 up and down the list. When the user depresses select button 254 the highlighted preset name is displayed on the display screen.

Figure 9:
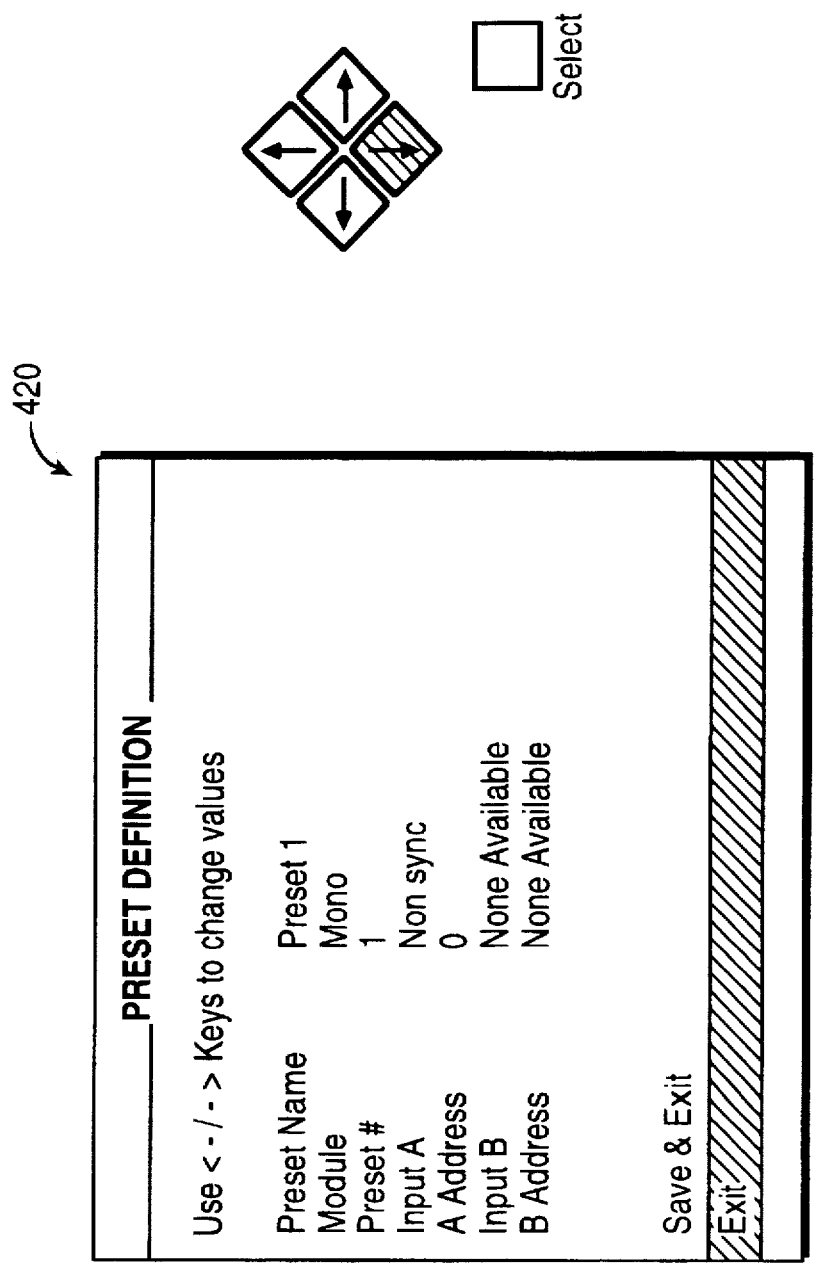
FIG. 9 shows a screen display generated when a first preset is selected.

FIG. 9 shows screen display 420 which is generated when Preset 1 has been selected from the screen display of FIG. 8. Screen display 420 is the preset definition screen showing the definition of Preset 1. Preset 1's definition includes the preset name, module, preset number, Input A assignment, Input A address, Input B assignment and Input B address. The user is able to change the preset name in the preset definition screen by using the arrow buttons. The module name is selectable from a list of predefined modules as described below. The preset number is a fixed number from 1 to 8 indicating that up to 8 different presets can be defined by the user. Inputs A and B can each be assigned to different PEC boards (discussed above). In the preferred embodiment, Inputs A and B are usually assigned to two different projectors used to project a film. By using a predesignated button in control area 258 of FIG. 6, the user can instantly switch between Input A and B.

Thus, the user is able to switch from one projector to another when it is necessary to change reels. The A and B addresses correspond to PEC board addresses so that any PEC board (and its associated input) that is connected to the DCP can be assigned to either of Inputs A or B. In FIG. 9, screen display 420 has a PEC board with address 0 assigned to Input A. The "Non Sync" input to PEC board 0 is being used which means that whatever input signal is connected to the RCA connector on the PEC board will be processed by the DCP.

The 8 presets can be recalled instantly by using preset buttons 256 on the front panel shown in FIG. 6. There are enough presets so that a user can program several different films as presets, if needed, as where the films have different sound modes or noise reduction formats.

Of interest in screen display 420 is the selection of a module called "Mono" in the "Module" field. In the preferred embodiment, the user is able to select from 15 predefined modules. Table I, below, shows the different predefined module names. The left column of names corresponds to modules with no noise reduction. The middle column of names includes those modules with noise reduction of a first type. The right column of names includes those modules with noise reduction of a second type.

TABLE I

| Module Name (No NR) | NR 1 | NR 2 |
| --- | --- | --- |
| Mono | Mono NR I | Mono NR II |
| Stereo Wide | Stereo Wide NR I | Stereo Wide NR II |
| Stereo Narrow | Stereo Narrow NR I | Stereo Narrow NR II |
| Surround Wide | Surround Wide NR I | Surround Wide NR II |
| Surround Narrow | Surround Narrow NR I | Surround Narrow NR II |

In the preferred embodiment, the user can cycle through, and select, a module by using the left and right arrow buttons (buttons 404 and 408 in FIG. 8) after moving the highlight bar to highlight the "Module" field by using the up and down arrow buttons (buttons 402 and 406 in FIG. 8). Each module includes parameters to set the routing and configuration of the DCP system as discussed above in FIGS. 1–5 to achieve the desired sound mode.

For example, selection of the Mono module causes the sum of the left and right input signals to be processed to result in the same signal on each of the L, LC, C, RC, R, SL, SR and SW signals In the preferred embodiment, the gain adjust, bass ext EQ, low pass and high pass filters, channel and master gain are all set by a technician when the DCP system is installed in the theater.

Figure 10:
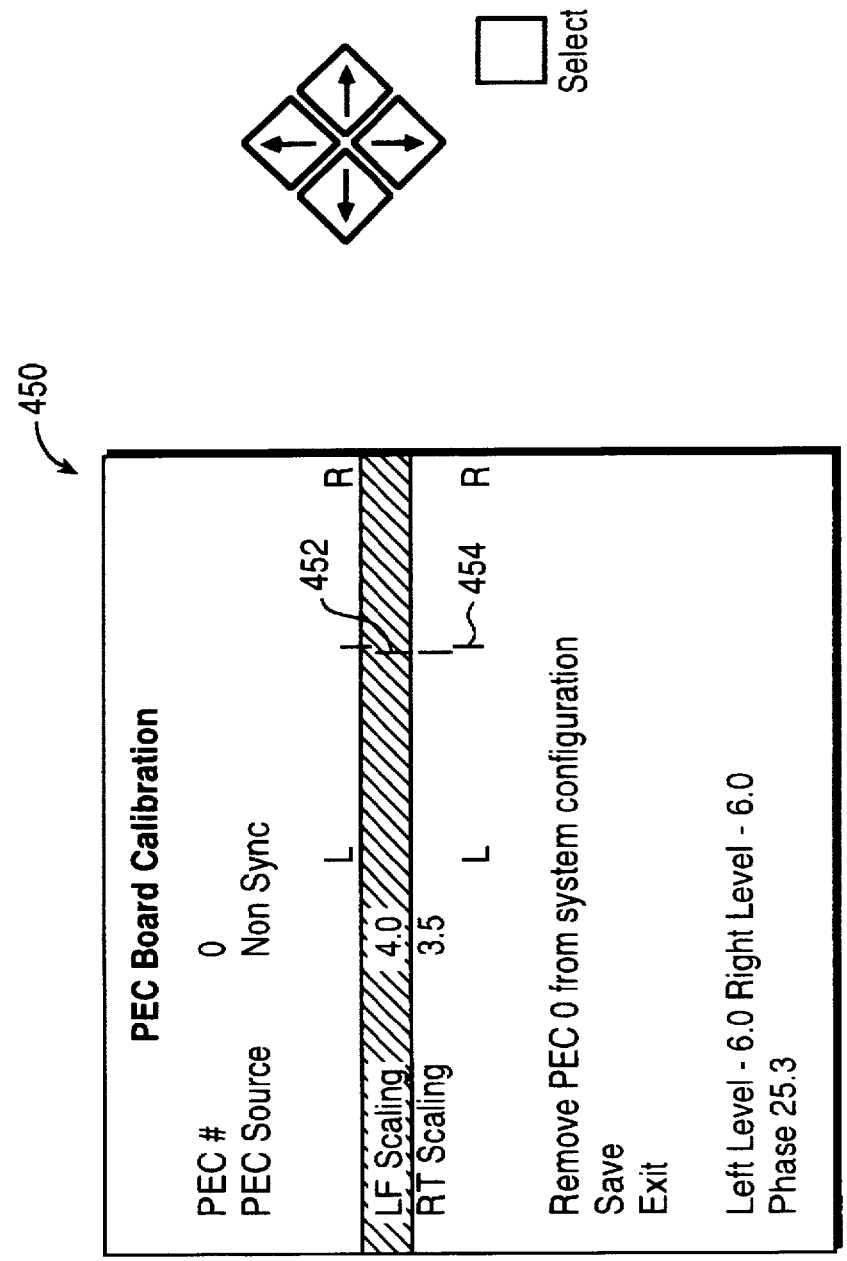
FIG. 10 shows a calibration screen for the photoelectric cell board.

FIG. 10 shows PEC Board Calibration screen 450. PEC Board Calibration screen 450 is used to allow the user to set the signal level inputs to the noise reduction processing. Referring to FIG. 4, the PEC Board Calibration screen 450 is used to set the gain adjust parameters for signals L and R. That is, the Calibrate Gain Adjust processing 182 of FIG. 4 uses the parameters set by the user from screen 450 to ensure that the inputs to the noise reduction processing 184 are at the proper level. As shown in FIG. 10, the user pressed the up and down arrow buttons to move the highlight bar over the desired signal to scale (either left, LF, or right, RT). Then, by using the right and left buttons the user adjusts the vertical line (452 or 454) until it is substantially centered. The numerical value of the adjustment is shown at the left of the each meter. If the user saves the parameters they become associated with the current preset.

Thus, the invention has been described in connection with the included Figures. While a specific embodiment of the invention has been presented is should be understood that the scope of the invention is determined solely by the appended claims.

APPENDIX A

```
/******************************************************************
PME - serial port 1 interupt service routine for eq 1-5-95
PME - added osc and frand for room EQ 3-1-95
PME - changed to used PEC input only 4-3-95
LM - added lowpass and highpass filters 5-3-95
LM - single coef dline buffer structure 5-10-95
PME - changed to receive IRQ1 only 5-15-95
LM - dual processor support
LM - production eqsetup code SHARC 1
```

-continued

```
LM - added buffers for new dspmain (sliteq, wide/narrow etc)
LM - moved subwoof eq to SHARC 2
LM - added surround
LM - added meter buffers and input scaling
LM - 40 bit delays in eq filters
serial port 1:
ADSP-21060 <- CS8412
ADSP-21060 -> CS8402A
serial port 0:
ADSP-21060 <- STD TDM RX BUS
ADSP-21060 -> STD TDM TX BUS
***********************************************************************/
#include <def21060.h>
#include <asm_sprt.h>
#include "dspmain.h"
#include "chan.h"
#include "commaddr.h"
.GLOBAL irq1;
.extern _store_ena;
.extern _input_scale_l;
.extern _input_scale_r;
.segment/dm seg_dmda;
.VAR osc_out;
.VAR noise_out;
.VAR _loop_delay = 0x2000;
.endseg;
.GLOBAL _lphp_coefs_ch0,_lphp_coefs_ch1,_lphp_coefs_ch2,_lphp_coefs_ch3;
.GLOBAL _lphp_coefs_ch4,_lphp_coefs_ch5,_lphp_coefs_ch6,_lphp_coefs_ch7;
.GLOBAL _eq_coefs_ch0,_eq_coefs_ch1,_eq_coefs_ch2,_eq_coefs_ch3;
.GLOBAL _eq_coefs_ch4,_eq_coefs_ch5,_eq_coefs_ch6,_eq_coefs_ch7;
.GLOBAL _gain_ch0,_gain_ch1,_gain_ch2,_gain_ch3;
.GLOBAL _gain_ch4,_gain_ch5,_gain_ch6,_gain_ch7;
.GLOBAL _sliteq_coefs;
.GLOBAL _eq_coefs_l,_eq_coefs_r,_gain_l,_gain_r;
.GLOBAL _loop_delay;
.GLOBAL _left_buf,_right_buf;
.segment/pm seg_pmda;
.var _eq_coefs_ch0[4*SECTIONS];
.var _lphp_coefs_ch0[8];
.var _gain_ch0;
.var _eq_coefs_ch2[4*SECTIONS];
.var _lphp_coefs_ch2[8];
.var _gain_ch2;
.var _eq_coefs_ch4[4*SECTIONS];
.var _lphp_coefs_ch4[8];
.var _gain_ch4;
.var _eq_coefs_ch6[4*SECTIONS];
.var _lphp_coefs_ch6[8];
.var _gain_ch6;
.var _eq_coefs_ch7[4*SECTIONS];
.var _lphp_coefs_ch7[8];
.var _gain_ch7;
.var _srnd_outbuf[CHANNELS];
/* The following variables are not used by this routine */
.var _lphp_coefs_ch5[4];
.var _gain_ch5;
.var _hp_coefs_ch5[4];
_sliteq_coefs:
_eq_coefs_l:
_eq_coefs_r:
_eq_coefs_ch1:
_eq_coefs_ch3:
.var _eq_coefs_ch5[4*SECTIONS];
_lphp_coefs_ch1:
.var _lphp_coefs_ch3[8];
_gain_l:
_gain_r:
_gain_ch1:
.var _gain_ch3;
.endseg;
.segment/dm seg_dm40;
.var _eq_dline_ch0[2*SECTIONS] = "zeros.dat";
.var _lphp_dline_ch0[4] = 0.0,0.0,0.0,0.0;
.var _eq_dline_ch2[2*SECTIONS] = "zeros.dat";
.var _lphp_dline_ch2[4] = 0.0,0.0,0.0,0.0;
.var _eq_dline_ch4[2*SECTIONS] = "zeros.dat";
.var _lphp_dline_ch4[4] = 0.0,0.0,0.0,0.0;
.var _eq_dline_ch6[2*SECTIONS] = "zeros.dat";
.var _lphp_dline_ch6[4] = 0.0,0.0,0.0,0.0;
.var _eq_dline_ch7[2*SECTIONS] = "zeros.dat";
```

```
.var _lphp_dline_ch7[4] = 0.0,0.0,0.0,0.0;
.endseg;
.segment/pm seg_pmco;
irq1:
/* switch to alt regs */
    BIT SET MODE1 SRD1H | SRD1L | SRD2H | SRD2L | SRRFL;
    BIT CLR MODE2 CAFRZ; /* Un-Freeze cache */
/* Move inputs from SHARC 2 into registers */
    F0 = dm(SRND_OUT2+0);
    F1 = dm(SRND_OUT2+1);
    F5 = dm(SRND_OUT2+2);
    F7 = dm(SRND_OUT2+3);
/* Input eq'd right center, left center, and subwoof from SHARC 2*/
    F9 = dm(LEFT_OUT2);
    F10 = dm(RIGHT_OUT2);
    F11 = dm(SUBWOOF_OUT2);
/* Input slit eq'ed left and right to store in meter buffers */
    r14 = dm(_store_ena);
    r14 = PASS r14;
    if EQ JUMP skip_store (db);
    I1 = _store_ena;
    f8 = dm(SLITEQL_OUT2);
    BIT CLR STKY CB7S;
    dm(I6,M1) = f8;
    f8 = dm(SLITEQR_OUT2);
    r8 = r8 - r8, dm(I7,M1) = f8;
    BIT TST STKY CB7S;
    if TF dm(I1, M5) = r8;
skip_store:
/* eq and lp/hp filtering - uses 40 bit precision */
    ustat1 = dm(SYSCON);
    BIT SET ustat1 IMDW1X;
    dm(SYSCON)=ustat1;
    b0=_eq_dline_ch0; { delay line pointer }
    b8=_eq_coefs_ch0; { coef pointer }
    I1 = I0;
    call _cascaded_biquad (db);   { input=F8, output=F8 }
    F8 = F0;
    r14=SECTIONS + 2;
    call _cascaded_biquad (db);   { input=F8, output=F8 }
    F0 = F8;
    F8 = F1;
    call _cascaded_biquad (db);   { input=F8, output=F8 }
    F1 = F8;
    F8 = F5;
    call _cascaded_biquad (db);   { input=F8, output=F8 }
    F5 = F8;
    F8 = F7;
    call _cascaded_biquad (db);   { input=F8, output=F8 }
    F6 = F8;
    F8 = F7;
    F7 = F8;
    BIT CLR ustat1 IMDW1X;
    dm(SYSCON) = ustat1;
/* Output all data - I5 -> _tx_buf0, r13 = 0x7fff */
    r0 = FIX F0;
    r0 = CLIP r0 BY r13;
    r1 = FIX F1,            dm(LEFT,I5)=r0;
    r1 = CLIP r1 BY r13;
    r1 = FIX F5,            dm(CENTER,I5)=r1;
    r1 = CLIP r1 BY r13;
    r1 = FIX F6,            dm(RIGHT,I5)=r1;
    r1 = CLIP r1 BY r13;
    r1 = FIX F7,            dm(SURR_LEFT,I5)=r1;
    r1 = CLIP r1 BY r13;
    r1 = FIX F9,            dm(SURR_RIGHT,I5)=r1;
    r1 = CLIP r1 BY r13;
    r1 = FIX F10,           dm(LEFT_CENTER,I5)=r1;
    r1 = CLIP r1 BY r13;
    r1 = FIX F11,           dm(RIGHT_CENTER,I5)=r1;
    r1 = CLIP r1 BY r13;
    dm(SUBWOOF,I5)=r1;
/* check input source */
    r14=dm(_in_source); /* 1 = oscillator */
    r14= r14 - 1;
/* generate OSC output */
    if eq call _osc (db);
    BIT SET MODEL
    nop;
    r14= r14 - 1; /* 2 = noise */
```

```
/* generate pink noise output if input=2 */
    if eq call _frand;
    r14=dm(_in_source);    /* 0 = audio input */
    r14 = PASS r14;
    if ne JUMP skip_input (db);
    F1 = F8;
/* read left channel */
    F2 = dm(_input_scale_l);
    r0=dm(_rx_buf0);        /* read serial port */
    r1=FEXT r0 BY 0:16 (SE);
    F8=float r1;
    F8 = F8 * F2;
/* read right channel */
    F2 = dm(_input_scale_r);
    r0=dm(_rx_buf0+4);
    r1=FEXT r0 BY 0:16 (SE);
    F1=float r1;
    F1 = F1 * F2;
skip_input:
/* Cleanup and return */
    BIT SET MODE2 CAFRZ;    /* Freeze cache */
    RTI (db);
/* pass inputs to SHARC 2 for left center,right center, and subwoof eq */
    dm(LEFT_IN2) = F8;
    dm(RIGHT_IN2) = F1;
.endseq;
```

We claim:

1. A method for reproducing sound from an audiovisual production having a sound portion, wherein the audiovisual production is played back using a playback device located in a theater, wherein the method utilizes a digital cinema sound system including a digital processor coupled to a memory, the playback device and a plurality of speakers, the method comprising the following steps:

creating a program definition including at least one parameter specifying a sound distribution among the plurality of speakers during the playback of the sound portion of the audiovisual production, wherein the specified sound distribution creates a characteristic sound quality of the sound portion of the audiovisual production;

storing the program definition in the memory of the digital cinema sound system; and using the processor to play back the sound portion of the audiovisual production according to the sound distribution specified by at least one parameter of the program definition, whereby the played back sound has the characteristic sound quality.

2. The method of claim 1, wherein the step of creating a program definition is performed in a first location remote from the theatre, wherein the processor is further coupled to a data port for receiving data, wherein the method uses a digital transfer system to move data between the first location and the theatre, wherein the step of storing the program definition includes the substeps of coupling the digital transfer system to the digital cinema sound system via the data port; and downloading the program definition into the memory of the digital cinema sound system.

3. The method of claim 2, wherein the digital transfer system includes a portable computer.

4. The method of claim 2, wherein the digital transfer system includes a data network.

5. The method of claim 2, wherein the digital transfer system includes a telephone line.

6. The method of claim 2, wherein the digital transfer system includes a radio link.

7. The method of claim 2, wherein the digital transfer system includes nonvolatile memory.

8. The method of claim 2, wherein the digital transfer system includes a recordable magnetic medium, the method further comprising the step of transferring the program definition to the memory of the digital cinema sound system via the digital transfer system.

9. The method of claim 1, wherein the specified sound distribution is for surround sound playback.

10. The method of claim 1, wherein the specified sound distribution is for stereo playback.

11. The method of claim 1, wherein the specified sound distribution is for mono playback.

12. A digital cinema sound system for playing back an audio visual production according to one or more stored parameters, the digital; cinema sound system comprising:

a playback device for playing back prerecorded sounds according to the audiovisual production;

a memory;

at least one speaker coupled to the playback device;

a parameter stored in the memory for specifying a characteristic sound quality of the playback of the prerecorded sounds;

input means coupled to the processor and memory for modifying the parameter to change the specification of the characteristic sound quality of the playback of the prerecorded sounds; and a digital processor coupled to the memory and the playback device for controlling the playback of the prerecorded sounds with the characteristic sound quality according to the stored parameter.

13. The digital cinema sound processor of claim 12, wherein the parameter specifies playback of the prerecorded sounds in a surround sound mode.

14. The digital cinema sound processor of claim 12, wherein the parameter specifies playback of the prerecorded sounds in a stereo mode.

15. The digital cinema sound processor of claim 12, wherein the parameter specifies playback of the prerecorded sounds in a mono mode.

16. The digital cinema sound processor of claim 12, further comprising noise reduction means coupled to the processor for performing one or more noise reduction modes on the prerecorded sounds.

17. The digital cinema sound processor of claim 16, wherein the parameter specifies playback of the prerecorded sounds in a Type A noise reduction mode.

18. The digital cinema sound processor of claim 16, wherein the parameter specifies playback of the prerecorded sounds in an SR noise reduction mode.

19. The digital cinema sound processor of claim 12, further comprising equalization means for equalizing the prerecorded sounds, wherein the parameter specifies an equalization setting for playback of the prerecorded sounds.

20. The digital cinema sound system of claim 12, further comprising:

a data port coupled to the processor, wherein the data port receives data from a data source, wherein the data includes a new parameter to be stored in the memory to replace any given previously stored parameter.

21. The digital cinema sound system of claim 20, wherein the data port is coupled to an external computer for downloading the new parameter from the external computer into the memory.

22. The digital cinema sound system of claim 20, wherein the data port is coupled to a data network for loading the new parameter from the data network to the memory.

23. The digital cinema sound system of claim 20, wherein the data port is coupled to a telephone line for loading the new parameter from a communication sent over the telephone line.

24. The digital cinema sound system of claim 20, wherein the data port is coupled to a radio link for loading the new parameter from a communication sent over the radio link.

25. A digital cinema sound system for playing back an audiovisual production according to one or more stored parameters, the digital cinema sound system comprising:

a playback device for playing back prerecorded sounds according to the audiovisual production;

a memory;

at least one speaker coupled to the playback device;

parameters stored in the memory for specifying the playback of the prerecorded sounds to create a characteristic sound quality;

input means coupled to the processor and memory for modifying the parameters to change the specification of playback of the prerecorded sounds to modify the characteristic sound quality;

a digital processor coupled to the memory and the playback device for controlling the playback of the prerecorded sounds according to the stored parameters;

sound distribution processing responsive to one or more of the stored parameters for playback of the prerecorded sounds in a sound distribution mode;

noise reduction processing responsive to one or more of the stored parameters for playback of the prerecorded sounds in a noise reduction mode; and equalization processing responsive to one or more of the stored parameters for playback of the prerecorded sounds in an equalization mode, wherein the sound distribution mode, the noise reduction mode and the equalization mode are all components of the characteristic sound quality.

26. A method for reproducing sound from an audiovisual production having a sound portion, wherein the audiovisual production is played back using a playback device located in a theater, wherein the method utilizes a digital cinema sound system including a digital processor coupled to a memory, the playback device, noise reduction processing for applying one of a plurality of noise reduction modes and at least one speaker, wherein the method further utilizes a digital transfer system for transferring data, the method comprising the following steps:

creating a program definition including at least one parameter specifying one of the plurality of noise reduction mode to be used during the playback of the sound portion of the audiovisual production;

storing the program definition in the memory of the digital cinema sound system; and using the processor to play back the sound portion of the audiovisual production according to the noise reduction mode specified by the at least one parameter of the program definition.

* * * * *